United States Patent
Sasaki

(10) Patent No.: US 9,696,177 B2
(45) Date of Patent: Jul. 4, 2017

(54) VEHICLE DRIVING GUIDANCE DEVICE AND METHOD

(71) Applicant: NISSAN MOTOR CO., LTD., Yokohama-shi, Kanagawa (JP)

(72) Inventor: Makiko Sasaki, Kanagawa (JP)

(73) Assignee: Nissan Motor Co., Ltd., Yokohama-shi, Kanagawa (JP)

(*) Notice: Subject to any disclaimer, the term of this patent is extended or adjusted under 35 U.S.C. 154(b) by 0 days.

(21) Appl. No.: 14/911,917

(22) PCT Filed: Aug. 29, 2013

(86) PCT No.: PCT/JP2013/073137
§ 371 (c)(1),
(2) Date: Feb. 12, 2016

(87) PCT Pub. No.: WO2015/029181
PCT Pub. Date: Mar. 5, 2015

(65) Prior Publication Data
US 2016/0195407 A1 Jul. 7, 2016

(51) Int. Cl.
*G01C 21/36* (2006.01)
*G08G 1/16* (2006.01)
*G06F 19/00* (2011.01)

(52) U.S. Cl.
CPC ..... *G01C 21/3697* (2013.01); *G01C 21/3602* (2013.01); *G08G 1/167* (2013.01); *G01C 21/3647* (2013.01)

(58) Field of Classification Search
CPC  G01C 21/36; G01C 21/3697; G01C 21/3602; G01C 21/3647; G01B 1/167; G06F 19/00

USPC .............. 701/36, 428; 340/995.17
See application file for complete search history.

(56) References Cited

U.S. PATENT DOCUMENTS

| 2005/0071082 | A1 | 3/2005 | Ohmura et al. |
| 2007/0118282 | A1 | 5/2007 | Yamamoto et al. |
| 2008/0294339 | A1 | 11/2008 | Tauchi et al. |
| 2012/0158256 | A1 | 6/2012 | Kuboyama et al. |
| 2014/0188388 | A1* | 7/2014 | Malahy ............... G01C 21/367 701/533 |
| 2015/0120160 | A1* | 4/2015 | Foltin ............... B60W 30/0956 701/70 |

FOREIGN PATENT DOCUMENTS

| JP | 08-178679 A | 7/1996 |
| JP | 3400584 B2 | 4/2003 |
| JP | 2007141178 A | 6/2007 |
| JP | 2009244167 A | 10/2009 |
| JP | 2011-185951 A | 9/2011 |
| JP | 2013-024679 A | 2/2013 |
| WO | 2011-010346 A1 | 1/2011 |

* cited by examiner

*Primary Examiner* — Tan Q Nguyen
(74) *Attorney, Agent, or Firm* — Young Basile Hanlon & MacFarlane, P.C.

(57) ABSTRACT

A traveling route data generation section serves as a predicted traveling route setting section and is configured to set a predicted traveling route to a host vehicle. A monitor serves as a display unit and is configured to display a route image corresponding to the predicted traveling route set to the host vehicle. The route image is displayed on the monitor in a display mode corresponding to a driving force and/or a braking force of the host vehicle.

13 Claims, 13 Drawing Sheets

VEHICLE DRIVING GUIDANCE DEVICE AND METHOD

TECHNICAL FIELD

The present invention relates to a vehicle driving guidance device and method for providing guidance to inform an occupant of predicted driving states in which a vehicle drives.

BACKGROUND

Japanese Patent Publication No. 2011-185951 describes a technique of dividing a target route into colored sections depending on a distance from a current position of a host vehicle to a guiding point (for example, an intersection).

The technique described in Japanese Patent Publication No. 2011-185951 does not sufficiently allow an occupant to recognize that the host vehicle is in either a driving or accelerating state or a braking or decelerating state, ahead of the current position.

SUMMARY

An object of the present invention is to provide a vehicle driving guidance device and method for providing guidance to an occupant indicative of which state the host vehicle is to be in ahead of time, a driving or accelerating state or a braking or decelerating state.

In order to achieve the object described above, the present invention displays, on a display unit, a route image corresponding to a predicted traveling route set to a host vehicle in a display mode corresponding to a driving force and/or a braking force of the host vehicle or acceleration and/or deceleration of the host vehicle.

The vehicle driving guidance device and method according to the present invention can provide guidance to an occupant indicative of which state the host vehicle is to be in, a driving or accelerating state or a braking or decelerating state.

DETAILED DESCRIPTION OF THE EMBODIMENTS

Hereinafter, a vehicle driving guidance device and method according to an embodiment will be explained with reference to appended drawings. The vehicle driving guidance device according to the embodiment is installed in, for example, a vehicle 100 shown in FIG. 2. In the following descriptions, the vehicle 100 is illustrated as an autonomous driving vehicle capable of autonomous driving controlled by the vehicle 100 itself, even when a driver is not present therein.

Figure 1:
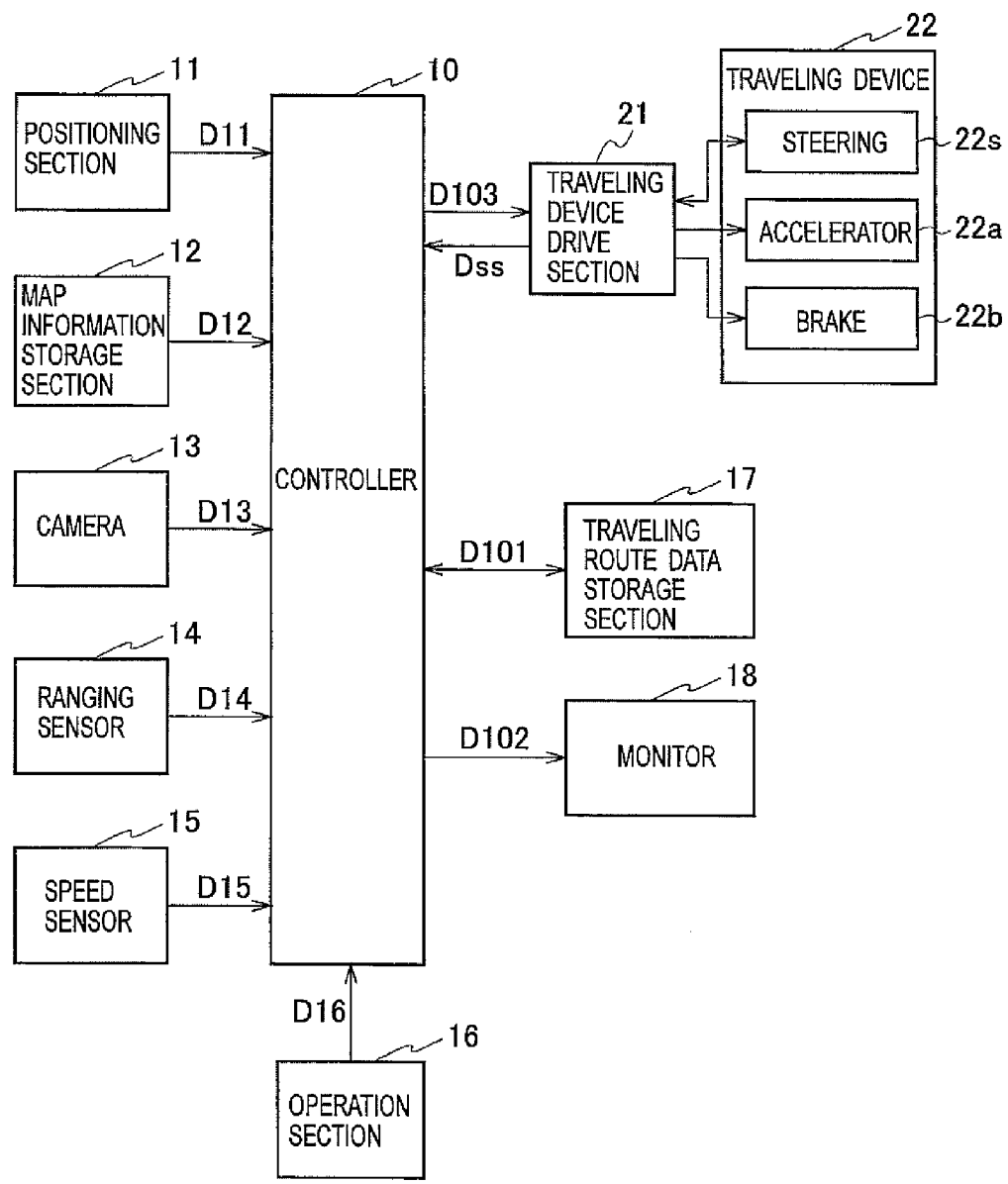
FIG. 1 is a block diagram showing a vehicle driving guidance device according to an embodiment.

A positioning section 11 shown in FIG. 1 obtains a current position of the vehicle 100. The positioning section 11 receives GPS radio waves emitted from a GPS satellite by a GPS antenna 11a shown in FIG. 2 to obtain the current position of the vehicle 100. Positioning data D11 of the current position of the vehicle 100 obtained by the positioning section 11 is input into a controller 10.

The positioning section 11 may obtain a current position of the vehicle 100 by positioning means such as a gyroscope instead of a GPS. The positioning section 11 may obtain a current position of the vehicle 100 by a combination of the GPS and the gyroscope. The function of the positioning section 11 may be implemented inside the controller 10.

A map information storage section 12 stores map information. The map information may be three-dimensional (3D) information. The map information storage section 12 may be an optional storage medium such as a hard disk drive, a semiconductor memory, or an optical disc. Map data D12 output from the map information storage section 12 is input into the controller 10.

Figure 3:
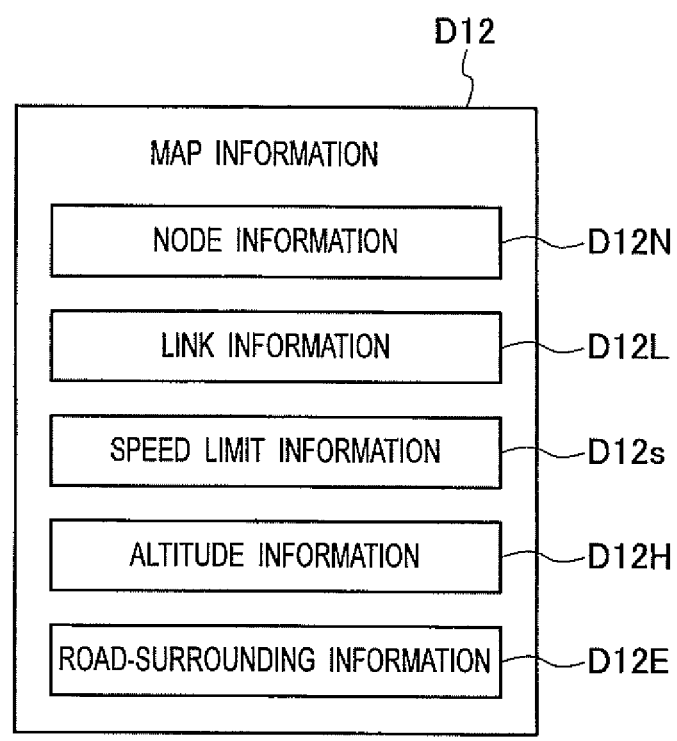
FIG. 3 is a view showing each piece of information included in map information used in the vehicle driving guidance device and method according to the embodiment.

As shown in FIG. 3, the map data D12 includes multiple pieces of information as map information. The map data D12 includes node information D12N indicating intersections or nodes between roads and link information D12L about links corresponding to road sections between the nodes indicated by the node information D12N. The map data D12 includes speed limit information D12s of a speed limit in the respective links (namely, the respective road sections).

The map data D12 may include altitude information D12H. The controller 10 can obtain a gradient of a road on which the vehicle 100 travels based on the altitude information D12H. The controller 10 may obtain a gradient of a road based on GPS radio waves. The map data D12 includes road-surrounding information D12E such as buildings around roads. The road-surrounding information is assumed to be 3D information.

Figure 2:
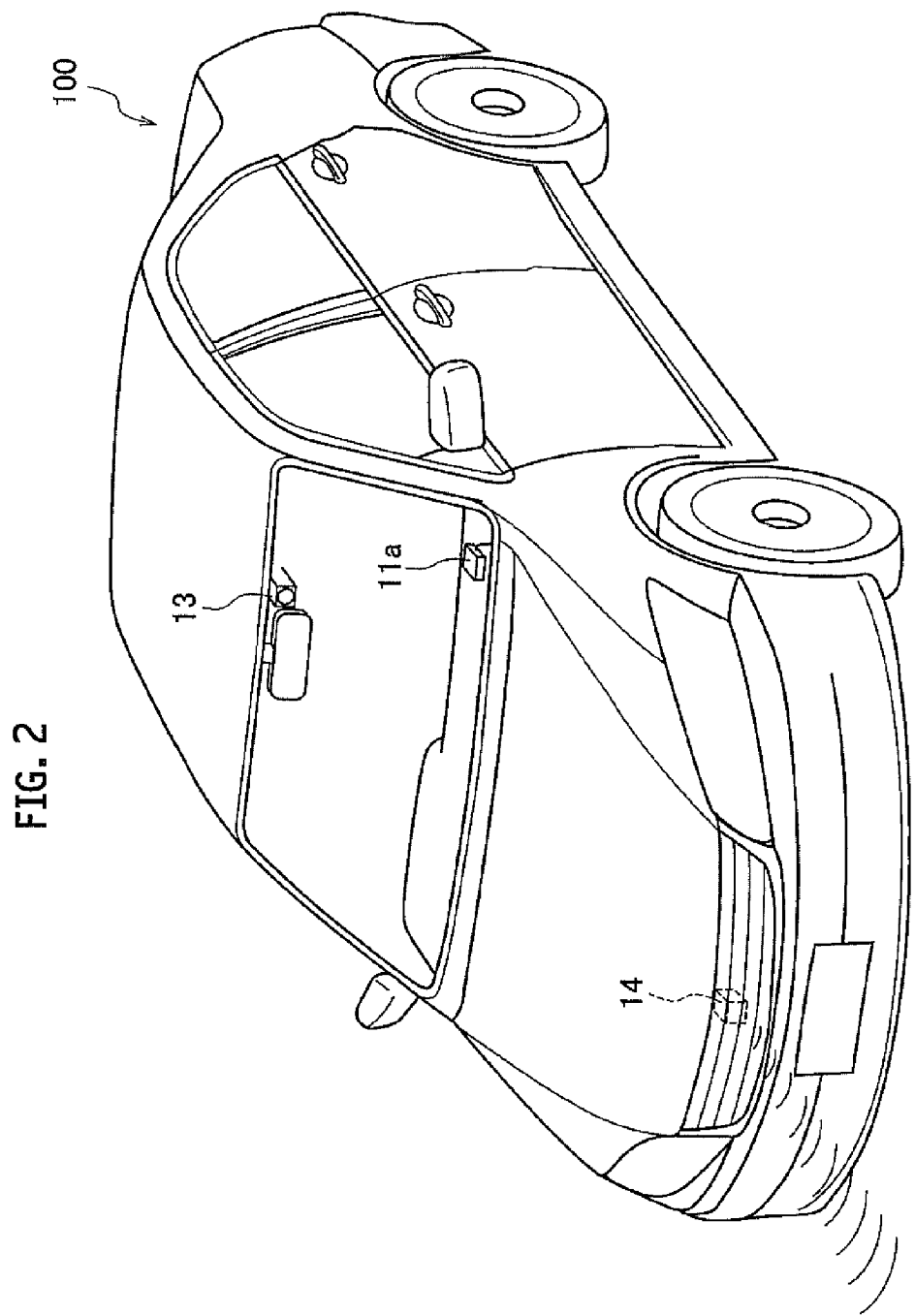
FIG. 2 is a perspective view showing an example of a vehicle in which the vehicle driving guidance device according to the embodiment is installed.

As shown in FIG. 2, the vehicle 100 is equipped inside thereof with a camera 13 for imaging the outside from the front of the vehicle 100. The camera 13 images surroundings ahead in such a manner as to include a road on which the vehicle 100 travels within an angle of view. The fixed position of the camera 13 is not limited to that shown in FIG. 2. Although FIG. 2 is illustrated with an example in which a single camera 13 is provided, a stereo camera including two cameras 13 may be provided instead. Imaging data D13 of surroundings ahead of the vehicle 100 imaged by the camera 13 is input into the controller 10.

A ranging sensor 14 is attached to the vehicle 100, for example, in the inside of a front grill. The ranging sensor 14 may include laser radar or millimetric wave radar. The ranging sensor 14 measures a distance between the vehicle 100 and an object present ahead of the vehicle 100. Ranging data D14 obtained by the ranging sensor 14 is input into the controller 10.

The ranging sensor 14 is used to detect obstacles located ahead of the vehicle 100. The obstacles located ahead of the vehicle 100 include an obstacle moving in front of the vehicle 100. A preceding vehicle traveling in front of the vehicle 100 is one of the obstacles. The controller 10 detects an obstacle based on the ranging data D14. The controller 10 may detect an object based on the ranging data D14 and the imaging data D13. The controller 10 may detect an object only based on the Imaging data D13.

The vehicle 100 includes a speed sensor 15 for detecting the speed of the traveling vehicle 100. The speed sensor 15 is a speed detecting section for detecting the speed of the vehicle 100 and is, for example, a wheel speed sensor. Speed data D15 obtained by the speed sensor 15 is input into the controller 10.

Once an occupant operates an operation section 16 to set a destination, setting data D16 of the destination is input into the controller 10. The operation section 16 may set other information necessary for route guidance other than the destination such as a transit point or a road given precedence over others. When other information is set, the setting data D16 is also applied with setting data of the other information.

The controller 10 generates traveling route data D101 about a route from a current position to a destination based on the positioning data D11, the map data D12 and the setting data D16. The traveling route data D101 is stored in a traveling route data storage section 17. The traveling route data storage section 17 is a nonvolatile memory.

As described below, in the vehicle driving guidance device and method according to the embodiment, the controller 10 generates traveling plan imaging data D102 visually indicative of how a traveling state of the vehicle 100 is controlled based on the traveling route data D101 and the respective pieces of information described below.

The traveling plan image data D102 is obtained in such a manner as to superpose a predicted traveling line in which the vehicle 100 travels and a traveling state distinction image on a camera image in the imaging data D13 obtained by the camera 13.

The traveling state distinction image indicates a traveling state of either a driving state in which the vehicle 100 is traveling while applied with a driving force or a braking state in which the vehicle 100 is traveling while applied with a braking force. The traveling state distinction image may indicate a traveling state of either an accelerating state in which the vehicle 100 is accelerating or a decelerating state in which the vehicle 100 is decelerating regardless of whether the vehicle 100 is in the driving state or the braking state. A traveling plan image included in the traveling plan image data D102 is explained in detail below.

The controller 10 supplies the traveling plan image data D102 to a monitor (display unit) 18.

The vehicle 100 includes a traveling device 22 for running the vehicle 100. The traveling device 22 includes steering 22s, an accelerator 22a and a brake 22b. The traveling device 22 may include a transmission such as gears for acceleration and deceleration. A traveling device drive section 21 drives the traveling device 22 in accordance with control by the controller 10.

Figure 4:
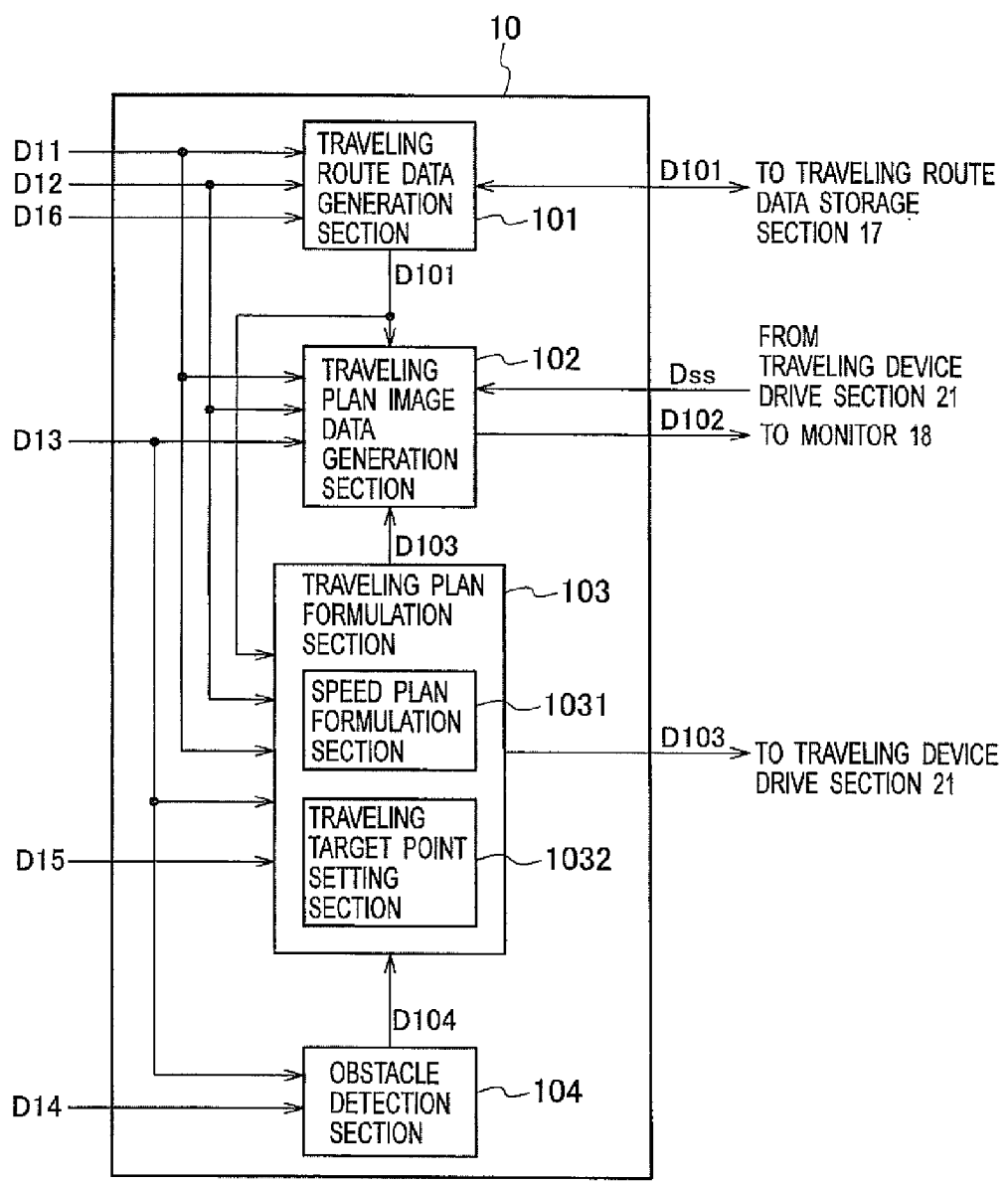
FIG. 4 is a block diagram showing a functional internal configuration of a controller 10 shown in FIG. 1.

Specific operations of the controller 10 are explained below with reference to FIG. 4. FIG. 4 shows a functional internal configuration of the controller 10. The controller 10 may include a microcomputer. The operations of the controller 10 described below can be implemented by a computer program.

As shown in FIG. 4, the positioning data D11, the map data D12 and the setting data D16 are input into a traveling route data generation section 101. The traveling route data generation section 101 generates, based on the map data D12, the traveling route data D101 indicating a predicted traveling route from a current position indicated by the positioning data D11 to a destination indicated by the setting data D16.

The traveling route data D101 is stored in the traveling route data storage section 17, and a portion of data in the traveling route data D101 necessary for route guidance in association with movement of the vehicle 100 is read out of the traveling route data storage section 17. When the vehicle 100 swerves from the predicted traveling route, the traveling route data generation section 101 generates new traveling route data D101 indicating another predicted traveling route so as to update the traveling route data D101. The traveling route data generation section 101 is a predicted traveling route setting section for setting a predicted traveling route for a host vehicle.

The traveling route data D101 read out from the traveling route data storage section 17 by the traveling route data generation section 101 is input into a traveling plan image data generation section 102 and a traveling plan formulation section 103.

In addition to the traveling route data D101, the positioning data D11, the map data D12 and the imaging data D13 are input into the traveling plan image data generation section 102. The processing implemented by the traveling plan image data generation section 102 is explained below.

In addition to the traveling route data D101, the positioning data D11, the map data D12, imaging data D13 and the speed data D15 are input into the traveling plan formulation section 103. The traveling plan formulation section 103 includes a speed plan formulation section 1031 for formulating a plan indicative of which speed is selected for driving the vehicle 100 and a traveling target point setting section 1032 for setting target points (traveling target points) along which the vehicle 100 travels.

As described above, the map data D12 includes the road-surrounding information D12E. Therefore, the traveling plan formulation section 103 can specify which point the vehicle 100 is currently traveling on the predicted traveling route indicated by the traveling route data D101 by comparing the map data D12 with the imaging data D13. The traveling plan formulation section 103 may specify a location on a road where the vehicle 100 is traveling with reference to the positioning data D11 in addition to the map data D12 and the imaging data D13.

The operations of the speed plan formulation section 1031 and the traveling target point setting section 1032 are explained below with reference to FIG. 5. The vehicle 100 is assumed to travel in a road section indicated by link L1, turn to the left at a node N1 and further travel in a road section indicated by link L2, as indicated by the arrow according to the traveling route data D101. The traveling target point setting section 1032 allots traveling target points P1, P2, P3, . . . at predetermined intervals to the road on which the vehicle travels.

The traveling target point setting section 1032 positions the respective traveling target points at intervals, each interval having a distance from a position where the vehicle 100 is located on the road to a position where the vehicle 100 travels for a predetermined period of time or to a position where the vehicle 100 travels a predetermined distance on the road ahead in the traveling direction. FIG. 5 is illustrated with an example in which the traveling target point setting section 1032 sets the respective traveling target points within a distance from the current position of the vehicle 100 to the traveling target point P7.

The distance from the current position of the vehicle 100 to the most distant traveling target point ahead of the vehicle 100 is referred to as a traveling plan formulation distance. The traveling target point setting section 1032 may determine the traveling plan formulation distance depending on the speed of the vehicle 100. Alternatively, the traveling target point setting section 1032 may increase the traveling plan formulation distance as the speed of the vehicle 100 increases. As the traveling plan formulation distance increases, traveling state distinction images described below have a greater scope.

In particular, the traveling target point setting section 1032 divides the speed into a plurality of ranges, and decreases the traveling plan formulation distance in an area with a slower speed allotted and increases the traveling plan formulation distance in an area with a faster speed allotted. For example, the traveling target point setting section 1032 may set the traveling plan formulation distance to 50 m when the speed is 40 km/h, and set the traveling plan formulation distance to 80 m when the speed is 60 km/h.

The traveling target point setting section 1032 may vary an interval at which the respective traveling target points are positioned depending on the speed. The traveling target point setting section 1032 shortens the interval in areas where the speed is slower and extends the interval in areas where the speed is faster. For example, the traveling target point setting section 1032 may set the interval to 1.5 m when the speed is 30 km/h and set the interval to 4 m when the speed is 60 km/h.

The traveling target point setting section 1032 defines, as the respective traveling target points, positions on the road through which, for example, the center of the vehicle 100 or the middle portion between the front wheels passes. The traveling plan formulation section 103 can recognize a lane in which the vehicle 100 travels according to the imaging data D13. The traveling target point setting section 1032 may allot the traveling target points P1, P2, P3, . . . to the middle of the lane.

As described above, the map data D12 includes the speed limit information D12s in the respective road sections. Therefore, the speed plan formulation section 1031 can formulate the speed plan indicative of which speed for driving the vehicle 100 is set to the respective road sections of the links L1 and L2.

Figure 5:
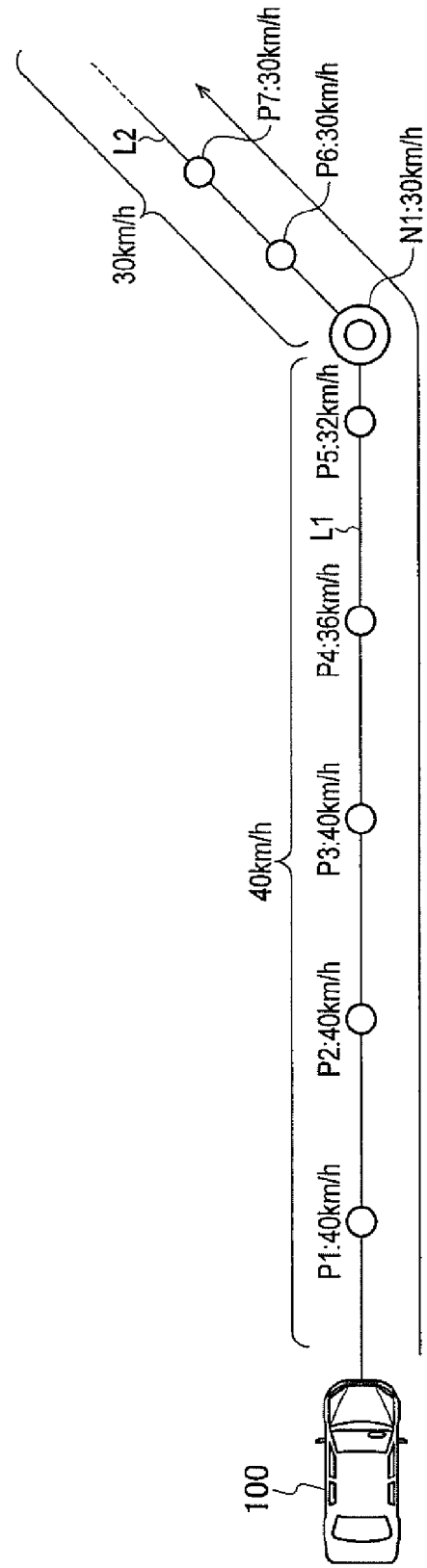
FIG. 5 is a view for explaining an outline of a traveling plan formulated by the vehicle driving guidance device and method according to the embodiment.

FIG. 5 is illustrated with an example in which the speed limit in the link L1 is set to 40 km/h, and the speed limit in the link L2 is set to 30 km/h. The speed plan formulation section 1031 sets the speed at the respective traveling target points P1 to P3 to 40 km/h, sets the speed at the traveling target point P4 to, for example, 36 km/h, and sets the speed at the traveling target point P5 to, for example, 32 km/h in the road section of the link L1.

The node N1 is located at a position different from the traveling target points set by the traveling target point setting section 1032. The speed plan formulation section 1031 may also allot the speed to the node N1. The speed plan formulation section 1031 sets the speed at the node N1 to 30 km/h. The speed plan formulation section 1031 sets the speed at the respective traveling target points P6 and P7 in the road section of the link L2 to 30 km/h.

As described above, the traveling plan formulation section 103 determines the traveling plan formulation distance on the road ahead on which the vehicle 100 travels and allots the traveling target points onto the road at predetermined intervals within the traveling plan formulation distance. The traveling plan formulation section 103 formulates the traveling plan indicative of the speed for driving the vehicle 100 set to the respective traveling target points.

The traveling plan formulation section 103 supplies the traveling plan data D103 indicating the formulated traveling plan to the traveling device drive section 21 and the traveling plan image data generation section 102. The traveling plan data D103 includes traveling target point data and speed data for the respective traveling target points. The traveling plan formulation section 103 may supply only the traveling target point data to the traveling plan image data generation section 102.

The traveling device drive section 21 drives the traveling device 22 based on the traveling plan data D103. The vehicle 100 thus automatically travels on the predicted traveling route indicated by the traveling route data D101 according to the traveling plan formulated by the traveling plan formulation section 103.

Figure 6:
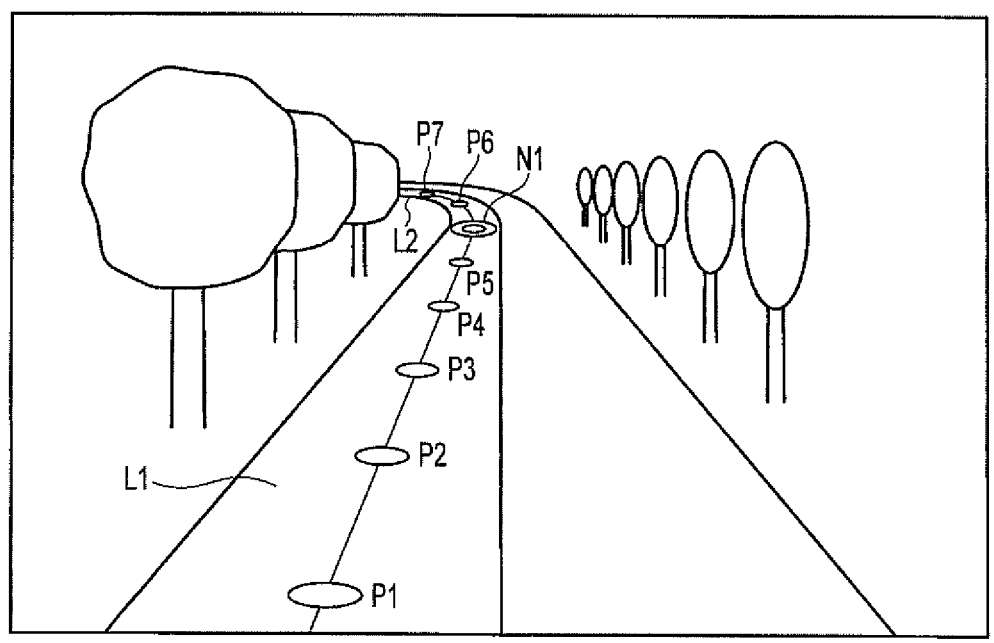
FIG. 6 is a view schematically showing a state in which a vehicle is traveling according to the traveling plan shown in FIG. 5.

FIG. 6 is a view as viewed from the vehicle 100 and schematically shows a state where the vehicle 100 is traveling in the road sections of the links L1 and L2 according to the traveling plan indicated by the traveling plan data D103. The traveling target points P1, P2, P3, . . . are allotted, for example, to the middle of the lane. The vehicle 100 is traveling along the traveling target points P1, P2, P3, . . . in sequence at a speed allotted to the respective traveling target points.

FIG. 5 shows a state where obstacles such as preceding vehicles traveling ahead of the vehicle 100 are not present so that the vehicle 100 can keep traveling at a speed within a speed limit, for convenience of explanation. In practice, the vehicle 100 is required to stop or decelerate at traffic lights or because of the presence of obstacles.

Traffic lights are placed adjacent to intersections, and heights thereof are approximately fixed. Therefore, the traveling plan formulation section 103 can recognize a color of a traffic light based on the imaging data D13. The speed plan formulation section 1031 varies the speed allotted to the respective traveling target points depending on a color of a traffic light used as a condition other than the speed limit.

The traveling plan formulation section 103 serves as a road information detection section for detecting information of the road on which the vehicle 100 travels on the predicted traveling route. The information of the road is in particular traffic signs including, for example, speed limit signs and traffic lights on the road.

The traveling plan formulation section 103 serves also as a predicted traveling state setting section for setting the vehicle 100 to either the driving state (or accelerating state) or the braking state (or decelerating state) when the vehicle 100 travels on the predicted traveling route based on the information of the road and the speed of the vehicle 100.

As shown in FIG. 4, the imaging data D13 and the ranging data D14 are input into an obstacle detection section 104. The obstacle detection section 104 detects obstacles by use of at least either the imaging data D13 or the ranging data D14. The obstacle detection section 104 may detect obstacles by use of both the imaging data D13 and the ranging data D14.

Here, obstacles are objects (including persons) that prevent safe driving of the vehicle 100. Specific examples of obstacles include a preceding vehicle, a person or a vehicle (such as an automobile or a bicycle) cutting in front of the vehicle 100, and a vehicle parked on a street.

When the obstacle detection section 104 detects an obstacle, the obstacle detection section 104 supplies the traveling plan formulation section 103 with obstacle detection data D104 indicating that the obstacle is detected. The obstacle detection data D104 includes distance data of a distance between the vehicle 100 and the obstacle. The speed plan formulation section 1031 varies the speed allotted to the respective traveling target points depending on the presence or absence of an obstacle, or a distance between the vehicle 100 and the obstacle used as a condition other than the speed limit and the color of the traffic light.

The traveling plan formulation section 103 serving as a predicted traveling state setting section sets the vehicle 100 to either the driving (or accelerating) state or the braking (or decelerating) state depending on the result of the presence or absence of the obstacle or the distance between the vehicle 100 and the obstacle detected.

The traveling plan image data generation section 102 specifies the position where the vehicle 100 is traveling on the road and recognizes the lane in the same manner as the traveling plan formulation section 103. The traveling plan image data generation section 102 generates, according to the traveling target point data included in the traveling plan data D103, image data obtained in such a manner as to superpose a predicted traveling line generated based on the traveling target points on a camera image in the imaging data D13.

Figure 7:
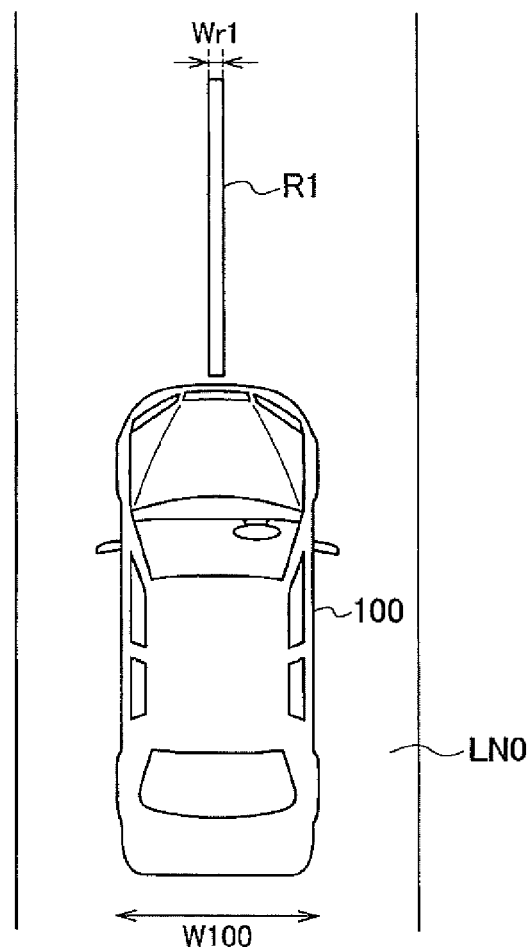
FIG. 7 is a view showing a first example of a predicted traveling line used in the vehicle driving guidance device and method according to the embodiment.

FIG. 7 shows a first example of the predicted traveling line. The vehicle 100 is assumed to be traveling upward in lane LN0. The first example is a predicted traveling line R1 which is a straight line (or a curved line) connecting the traveling target points and having predetermined width Wr1. The predicted traveling line R1 of the first example is a line through which approximately the center of a vehicle width W100 of the vehicle 100 passes.

Figure 8:
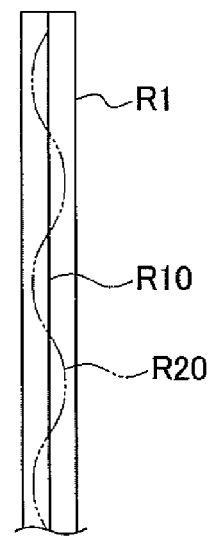
FIG. 8 is a view for explaining a detail of the first example of the predicted traveling line shown in FIG. 7.

The traveling plan image data generation unit 102 determines the width Wr1 of the predicted traveling line R1 as follows. A straight line R10 shown in FIG. 8 is a line connecting the respective traveling target points. Here, the vehicle 100 may not travel along the straight line R10 because of bumps on the surface of the road even when the traveling device drive section 21 drives the steering 22s based on the traveling plan data D103 so as to drive the vehicle 100 straight. The vehicle 100 weaves as indicated by curved line R20.

When the predicted traveling line is the narrow straight line R10 as shown in FIG. 8, an occupant may feel uncomfortable because of unconformity of the predicted traveling line with the vehicle 100 weaving. Thus, in view of such weaving of the vehicle 100, the width Wr1 of the predicted traveling line R1 may be set to a weaving width or greater.

A level of weaving of the vehicle 100 corresponds to a control error Dss derived from deviation of the steering 22s caused when driven to drive the vehicle 100 straight. As shown in FIG. 4, the control error Dss is input to the traveling plan image data generation section 102 from the traveling device drive section 21. The traveling plan image data generation section 102 determines the width Wr of the predicted traveling line R1 depending on the control error D22 of the steering 22s.

Figure 9:
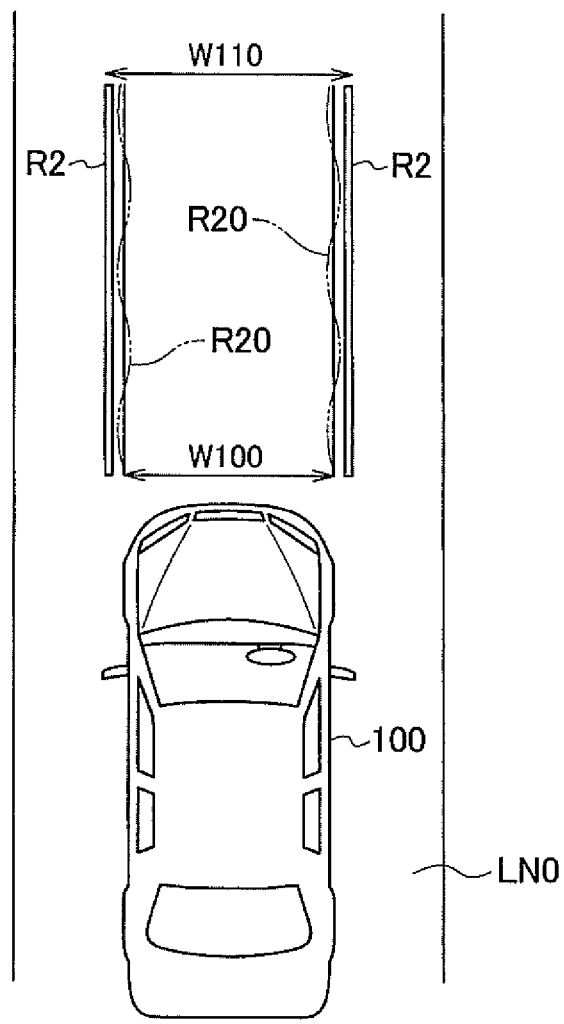
FIG. 9 is a view showing a second example of the predicted traveling line used in the vehicle driving guidance device and method according to the embodiment.

FIG. 9 shows a second example of the predicted traveling line. The second example includes two predicted traveling lines R2 aligned parallel to the straight line connecting the respective traveling target points. The traveling plan image data generation section 102 sets a distance between the two predicted traveling lines R2 approximately to the vehicle width W100 of the vehicle 100. The traveling plan image data generation section 102 may set the distance between the two predicted traveling lines R2 to a width W110 greater than the vehicle width W100 while taking the control error Dss into consideration.

The width W110 may be a width between the left predicted traveling line R2 defined on the outside of weaving toward the left of the vehicle 100 and the right predicted traveling line R2 defined on the outside of weaving toward the right of the vehicle 100. The distance between the two predicted traveling lines R2 set to the width W110 prevents the vehicle 100 from protruding outside of the predicted traveling lines R2 even when the vehicle 100 weaves. This contributes to preventing an occupant from feeling uncomfortable.

As described below, the single predicted traveling line R1 or the area defined by the two predicted traveling lines R2 is a portion on which distinction images indicating a traveling state of the vehicle (traveling state distinction images) are superposed. The traveling plan image data generation section 102 sets the superposed portion in a range of a minimum width corresponding to the width of the control error of the steering 22s of the vehicle 100 to a maximum width obtained in such a manner as to add the width of the control error to the vehicle width W100 of the vehicle 100.

The traveling plan image data generation section 102 generates the traveling plan image data D102 obtained in such a manner as to superpose the predicted traveling line R1 or the predicted traveling lines R2 on the camera image and further superpose the traveling state distinction images indicating the traveling state of the vehicle 100 thereon. The traveling state of the vehicle 100 is in particular either the driving (or accelerating) state or the braking (or decelerating) state.

The traveling state of the vehicle 100 may include a coasting state in which either a driving force or a braking force is not applied. Alternatively, the coasting state may include a state in which the vehicle 100 is accelerating and a state in which the vehicle 100 is decelerating.

Figure 10:
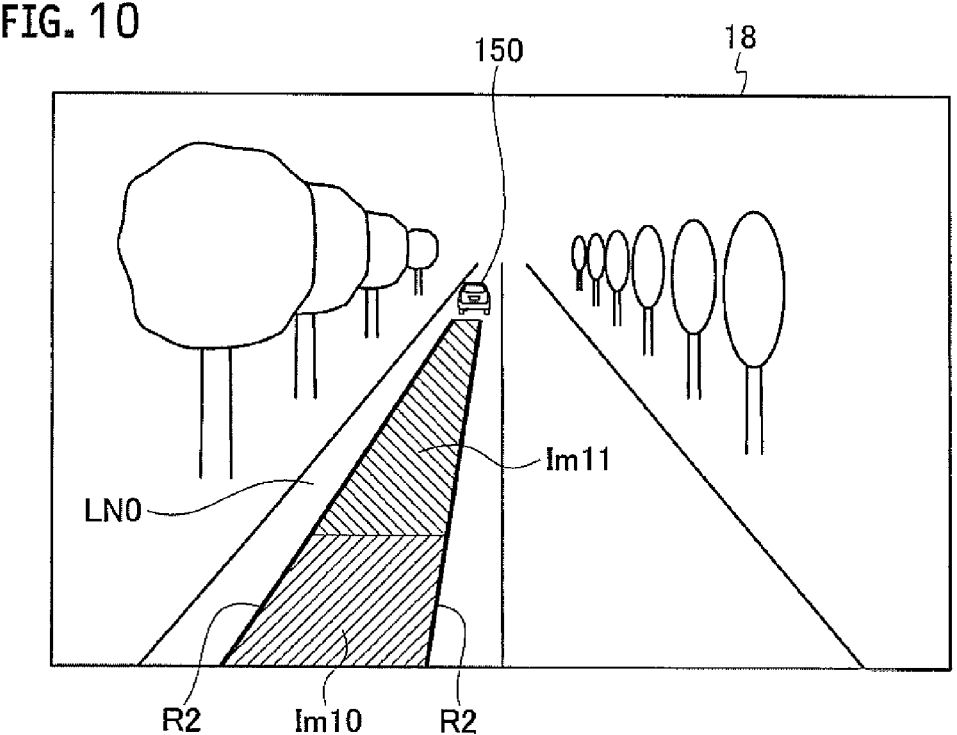
FIG. 10 is a view showing a first example of a traveling plan image indicating a constant driving state and a decelerating state used in the vehicle driving guidance device and method according to the embodiment.
Figure 11:
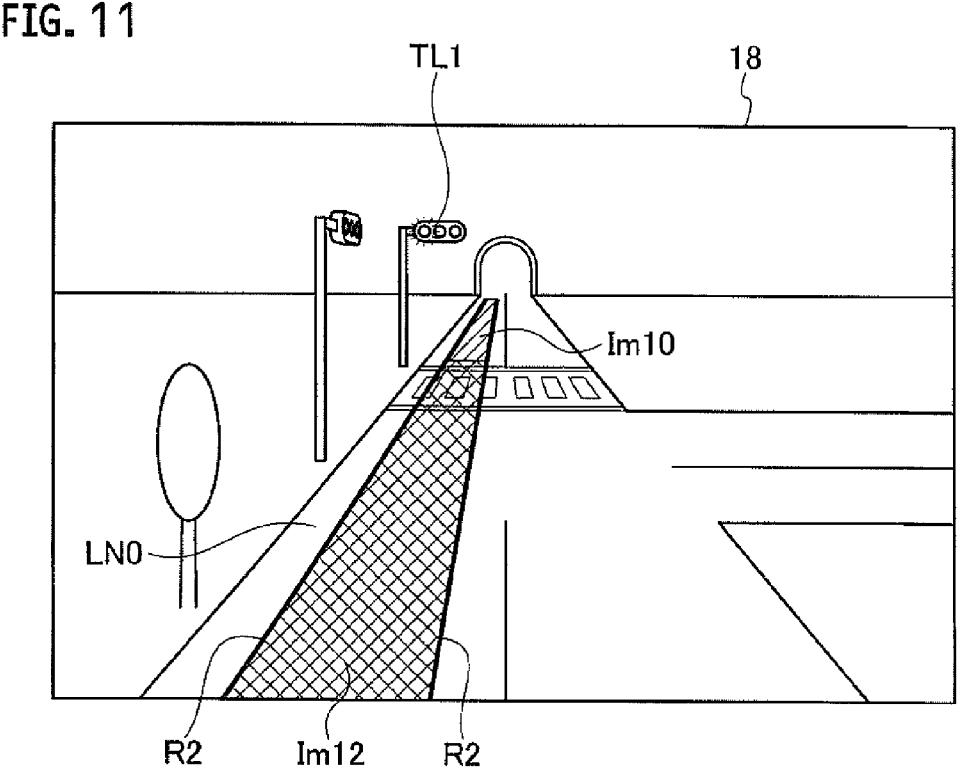
FIG. 11 is a view showing a first example of a traveling plan image indicating a constant driving state and an accelerating state used in the vehicle driving guidance device and method according to the embodiment.

FIG. 10 and FIG. 11 each show a first example of traveling state distinction images displayed on the monitor 18 and superposed on the camera image. FIG. 10 and FIG. 11 each show a case of using the two predicted traveling lines R2 explained with reference to FIG. 9.

In FIG. 10, the obstacle detection section 104 detects, as an obstacle, a preceding vehicle 150 located ahead of the vehicle 100 (host vehicle) traveling in lane LN0 and supplies the obstacle detection data D104 to the traveling plan formulation section 103. The traveling plan formulation section 103 supplied with the obstacle detection data D104 allots the speed to the respective traveling target points in such a manner as to gradually decelerate the vehicle 100.

As shown in FIG. 10, the traveling plan image data generation section 102 superposes a traveling state distinction image (first distinction image) Im10 on the region between the two predicted traveling lines R2 in which the vehicle 100 is traveling at a constant speed in the driving state. The traveling plan image data generation section 102 further superposes a traveling state distinction image (second distinction image) Im11 on the region between the two predicted traveling lines R2 in which the vehicle 100 is decelerating in the braking state.

The traveling plan image data generation section 102 generates, for example, the traveling plan image data D102 in which the traveling state distinction image Im10 and the traveling state distinction image Im11 differ in color from each other. The traveling state distinction image Im10 and the traveling state distinction image Im11 may be semitransparent images. When the traveling state distinction image Im10 and the traveling state distinction image Im11 are semitransparent images, the road (lane image) is prevented from being completely blocked so that traffic signs or objects on the road can be recognized.

An occupant sees the traveling plan image in the traveling plan image data D102 displayed on the monitor 18 so as to easily recognize that the vehicle 100 is controlled being shifted from the constant traveling state to the decelerating state.

FIG. 11 shows a state where the vehicle 100 is stopping in front of an intersection because a traffic light TL1 is red but starts moving since the traffic light TL1 turns green. The traveling plan formulation section 103 sets the respective traveling target points to a speed in such a manner as to gradually accelerate the vehicle 100 after starting until traveling a predetermined distance. Once the vehicle 100 reaches a speed limit, the traveling plan formulation section 103 sets the respective traveling target points to drive the vehicle 100 at a constant speed.

As shown in FIG. 11, the traveling plan image data generation section 102 superposes a traveling state distinction image (third distinction image) Im12 on the region between the two predicted traveling lines R2 in which the vehicle 100 is accelerating in the driving state. The traveling plan image data generation section 102 further superposes the traveling state distinction image Im10 on the region between the two predicted traveling lines R2 in which the vehicle 100 is traveling at a constant speed in the driving state, as in the case of FIG. 10.

In FIG. 11, the traveling plan image data generation section 102 also generates the traveling plan image data D102 in which the traveling state distinction image Im10 and the traveling state distinction image Im12 differ in color from each other. The traveling state distinction image Im12 may also be a semitransparent image for the same reason.

An occupant sees the traveling plan image indicated by the traveling plan image data D102 displayed on the monitor 18 so as to easily recognize that the vehicle 100 is controlled being shifted from the accelerating state to the constant traveling state.

In FIG. 10 and FIG. 11, the traveling plan image data generation section 102 may change the color of the predicted traveling lines R2 so as to differ from the respective traveling state distinction images Im10, Im11 and Im12 or set the color of the predicted traveling lines R2 to conform to the respective traveling state distinction images Im10, Im11 and Im12. When the predicted traveling lines R2 are colored in the same manner as the traveling state distinction images Im10, Im11 and Im12, the traveling plan image thus obtained is substantially the same as an image only including the traveling state distinction images Im10, Im11 and Im12.

The traveling state distinction images are not limited to those having different colors as shown in FIG. 10 and FIG. 11. Different distinction images varying in shape depending on a traveling state may be used instead.

Figure 12:
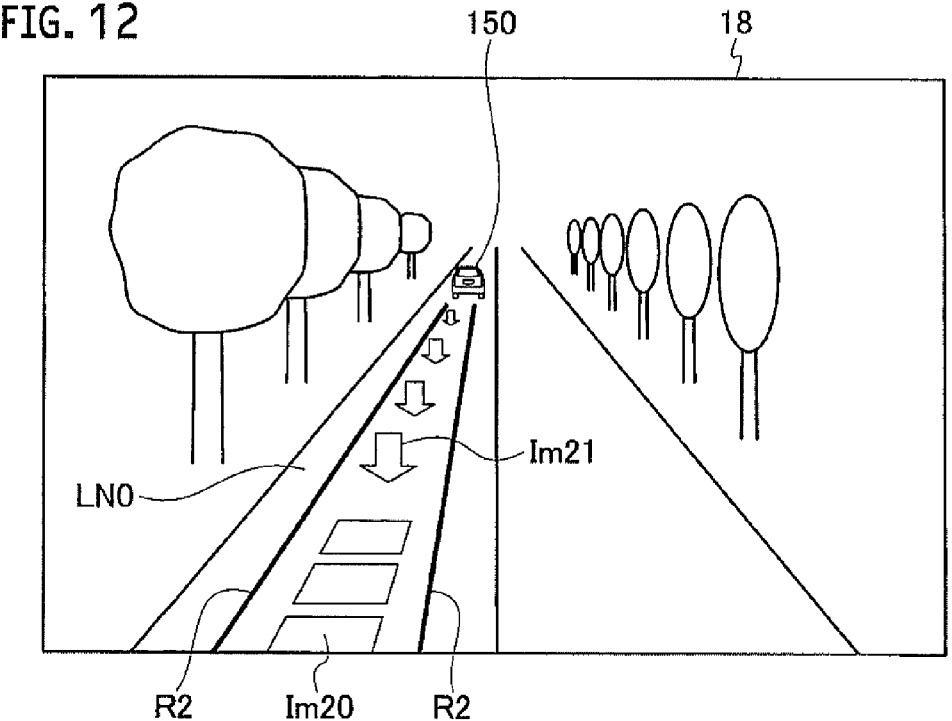
FIG. 12 is a view showing a second example of the traveling plan image indicating a constant driving state and a decelerating state used in the vehicle driving guidance device and method according to the embodiment.
Figure 13:
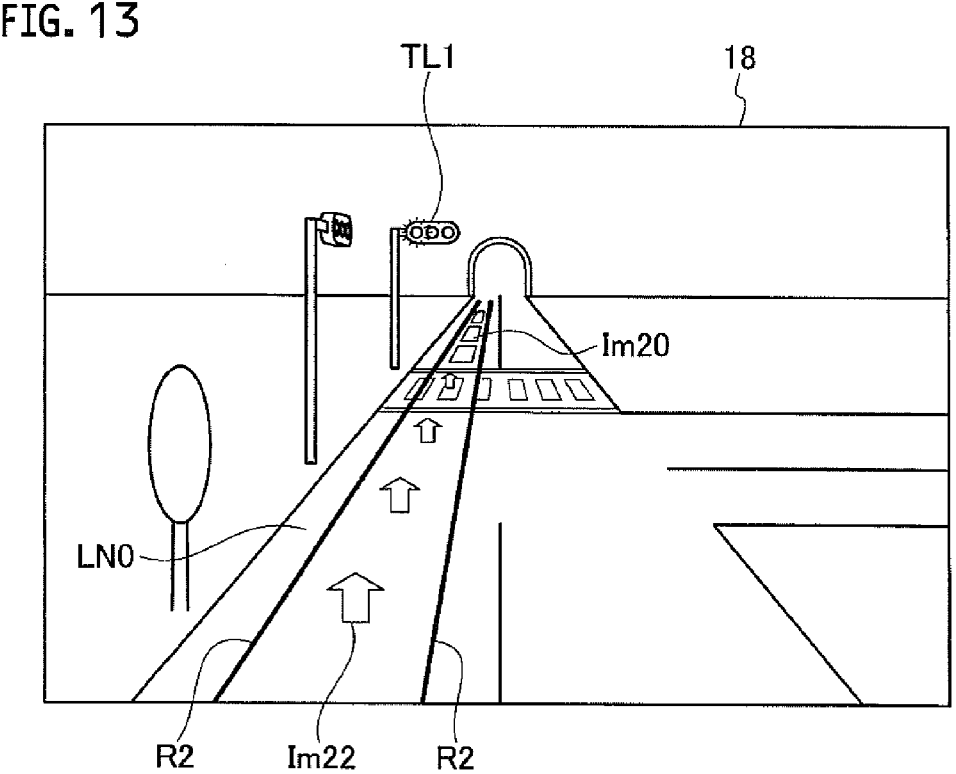
FIG. 13 is a view showing a second example of the traveling plan image indicating a constant driving state and an accelerating state used in the vehicle driving guidance device and method according to the embodiment.

FIG. 12 and FIG. 13 each show a second example of the traveling state distinction images displayed on the monitor 18 and superposed on the camera image.

FIG. 12 shows an example of distinction images varying in shape depending on the traveling state, instead of the traveling state distinction image Im10 and the traveling state distinction image Im11 shown in FIG. 10. As shown in FIG. 12, the traveling plan image data generation section 102 superposes traveling state distinction images (first distinction images) Im20 having, for example, a square shape on the region in which the vehicle 100 is traveling at a constant speed in the driving state.

The traveling plan image data generation section 102 also superposes traveling state distinction images (second distinction images) Im21 having, for example, a downward arrow shape on the region in which the vehicle 100 is decelerating in the braking state.

FIG. 13 shows an example of distinction images varying in shape depending on the traveling state, instead of the traveling state distinction image Im10 and the traveling state distinction image Im12 shown in FIG. 11. As shown in FIG. 13, the traveling plan image data generation section 102 superposes traveling state distinction images (third distinction images) Im22 having, for example, an upward arrow shape on the region in which the vehicle 100 is accelerating in the driving state.

The traveling plan image data generation section 102 also superposes the traveling state distinction images Im20 having a square shape on the region in which the vehicle 100 is traveling at a constant speed in the driving state, as in the case of FIG. 12.

The square shape, the downward arrow shape and the upward arrow shape of the traveling state distinction images Im20, Im21 and Im22 are merely examples and may be any shape as long as it can provide an occupant with images of constant speed, deceleration and acceleration. The outlined traveling state distinction images Im20, Im21 and Im22 with the inside blank hardly has influence on recognition of traffic signs or objects on the road.

Here, when the predicted traveling line R1 as explained in FIG. 7 is used instead, the predicted traveling line R1 may be divided in parts with different colors in the same manner as the traveling state distinction images Im10, Im11 and Im12. Alternatively, distinction images similar to the traveling state distinction images Im10, Im11 and Im12 may be superposed on the predicted traveling line R1.

FIG. 10 to FIG. 13 are illustrated with the example in which the traveling plan image is indicated with three different kinds of sections showing either the driving state or the braking state varying depending on acceleration of the vehicle 100.

For example, when the vehicle 100 travels on a road with an increasing gradient, the vehicle 100 may be in the driving state in which the accelerator 22a is pushed down so as to travel at a constant speed. When the vehicle 100 travels on a road with a decreasing gradient, the vehicle 100 may be in the braking state in which the accelerator 22a is released so as to travel at a constant speed. The traveling plan image data generation section 102 may use a traveling plan image indicated with different traveling state distinction images indicative of which state the vehicle 100 is in, the driving state or the braking state, regardless of acceleration of the vehicle 100.

The traveling plan formulation section 103 may also formulate a traveling plan indicating a predicted traveling state of the driving state and the braking state depending on information of the road on which the vehicle 100 travels, such as a gradient or curvature. In such a case, the traveling plan image data generation section 102 superposes, on the camera image, traveling state distinction images set depending on a gradient or curvature of the road.

Since the traveling state distinction images vary depending on the conditions of the road, an occupant can recognize the predicted traveling state within a distance for which the traveling plan has been formulated from the current position of the vehicle 100 while recognizing the conditions of the road.

Further, the traveling plan image data generation section 102 may indicate the traveling state of either the accelerating state of the vehicle 100 or the decelerating state of the vehicle 100 regardless of whether the vehicle 100 is in the driving state or the braking state.

Figure 14:
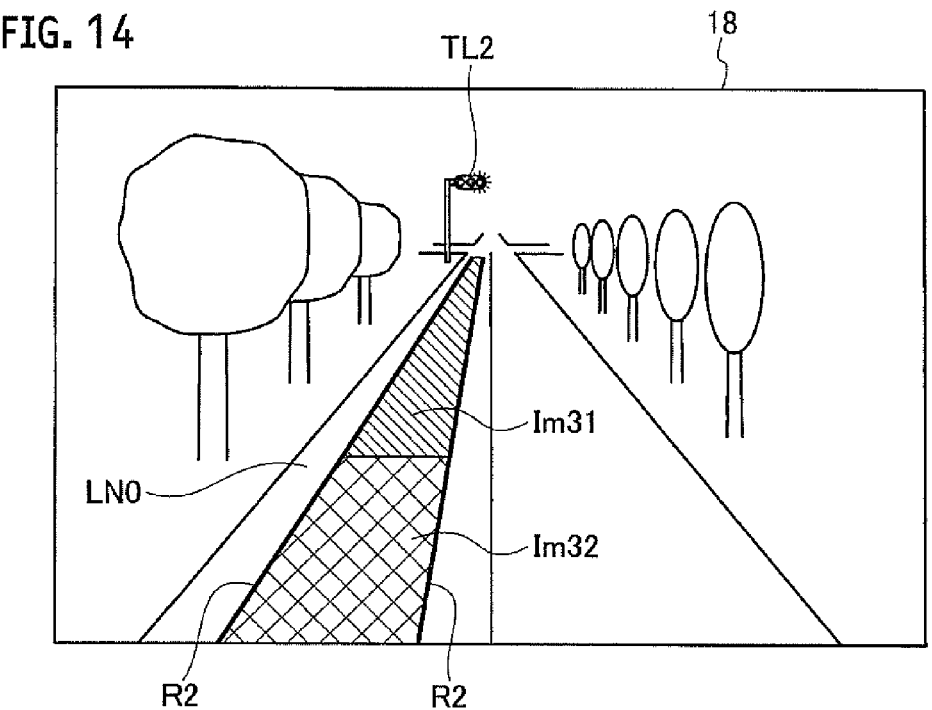
FIG. 14 is a view showing a third example of the traveling plan image indicating an accelerating state and a decelerating state used in the vehicle driving guidance device and method according to the embodiment.

FIG. 14 shows a third example of the traveling state distinction images only indicating the accelerating state and the decelerating state regardless of whether the vehicle 100 is in the driving state or the braking state. In FIG. 14, a traffic light TL2 ahead is red. As shown in FIG. 14, the traveling plan image data generation section 102 superposes a traveling state distinction image Im32 on a region in which the vehicle 100 is accelerating and superposes a traveling state distinction image Im31 on a region in which the vehicle 100 is decelerating.

Figure 15:
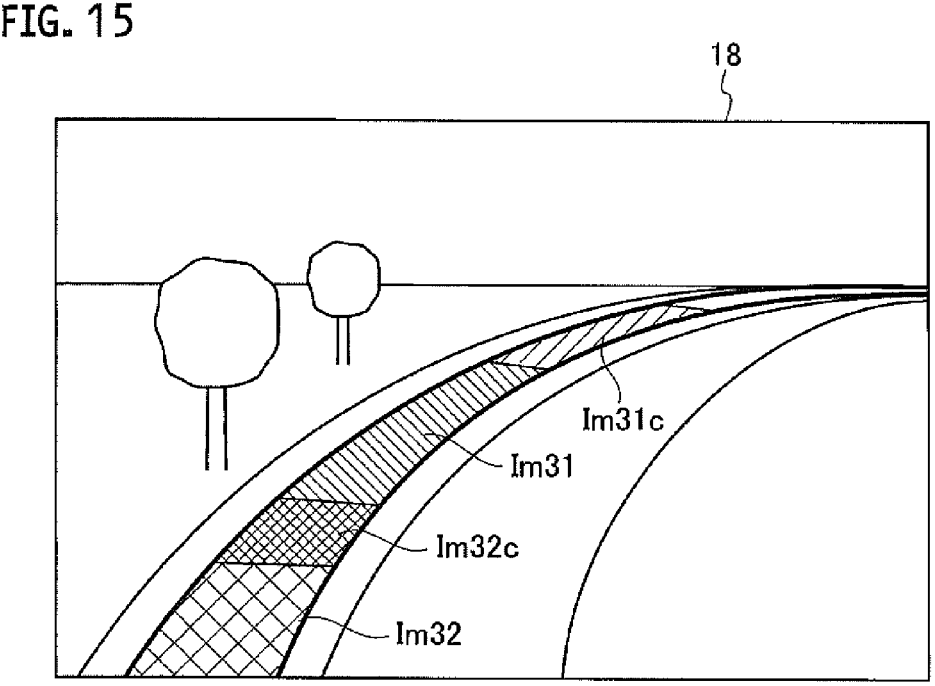
FIG. 15 is a view showing a fourth example of the traveling plan image indicating an accelerating state, a decelerating state and a coasting state used in the vehicle driving guidance device and method according to the embodiment.

FIG. 15 shows a fourth example of the traveling state distinction images. Here, the vehicle 100 may be in a coasting state of the accelerating state depending on conditions of a road, while the vehicle 100 is not in either the driving state or the braking state. The vehicle 100 may also be in a coasting state of the decelerating state depending on conditions of the road, while the vehicle 100 is not in either the driving state or the braking state. FIG. 15 is an example indicating the traveling state distinction images sorted according to a coasting state which is part of the accelerating state and a coasting state which is part of the decelerating state.

As shown in FIG. 15, the traveling plan image data generation section 102 superposes the traveling state distinction image Im32 on the region in which the vehicle 100 is accelerating and superposes a traveling state distinction image Im32c on a region in which the vehicle 100 is in a coasting state of the accelerating state. Further, the traveling plan image data generation section 102 superposes the traveling state distinction image Im31 on the region in which the vehicle 100 is decelerating and superposes a traveling state distinction image Im31c on a region in which the vehicle 100 is in a coasting state of the decelerating state.

The traveling state distinction images according to the vehicle driving guidance device and method are summarized as follows. The traveling state recognition images represent a route image corresponding to the predicted traveling route set to the host vehicle. As a first aspect, the route image can be displayed in a display mode corresponding to each of the driving state (driving force) and the braking state (braking force). FIG. 10 and FIG. 11 each indicate the route image in such a manner as to vary the driving state depending on the accelerating state and the constant traveling state. The first aspect provides the route image displayed in the modes corresponding to the driving state and the braking state without the accelerating state and the constant driving state differentiated.

FIG. 10 to FIG. 13 each show a second aspect of the route image displayed in a display mode corresponding to each of the driving state and the braking state and indicate the route image in such a manner as to vary the driving state depending on the accelerating state and the constant traveling state.

As a third aspect, as explained with reference to FIG. 14, the route image can be displayed in a display mode corresponding to each of the accelerating state (acceleration) and the decelerating state (deceleration). As a fourth aspect, as explained with reference to FIG. 15, the route image can be displayed in a display mode corresponding to each of the accelerating state, the decelerating state and the coasting state. In FIG. 15, only the coasting state of the decelerating state may be displayed without the coasting state of the accelerating state displayed.

As other aspects, the route image may be displayed in display modes depending on a level of a driving force and a braking force or may be displayed in display modes depending on a level of acceleration and deceleration.

Figure 16:
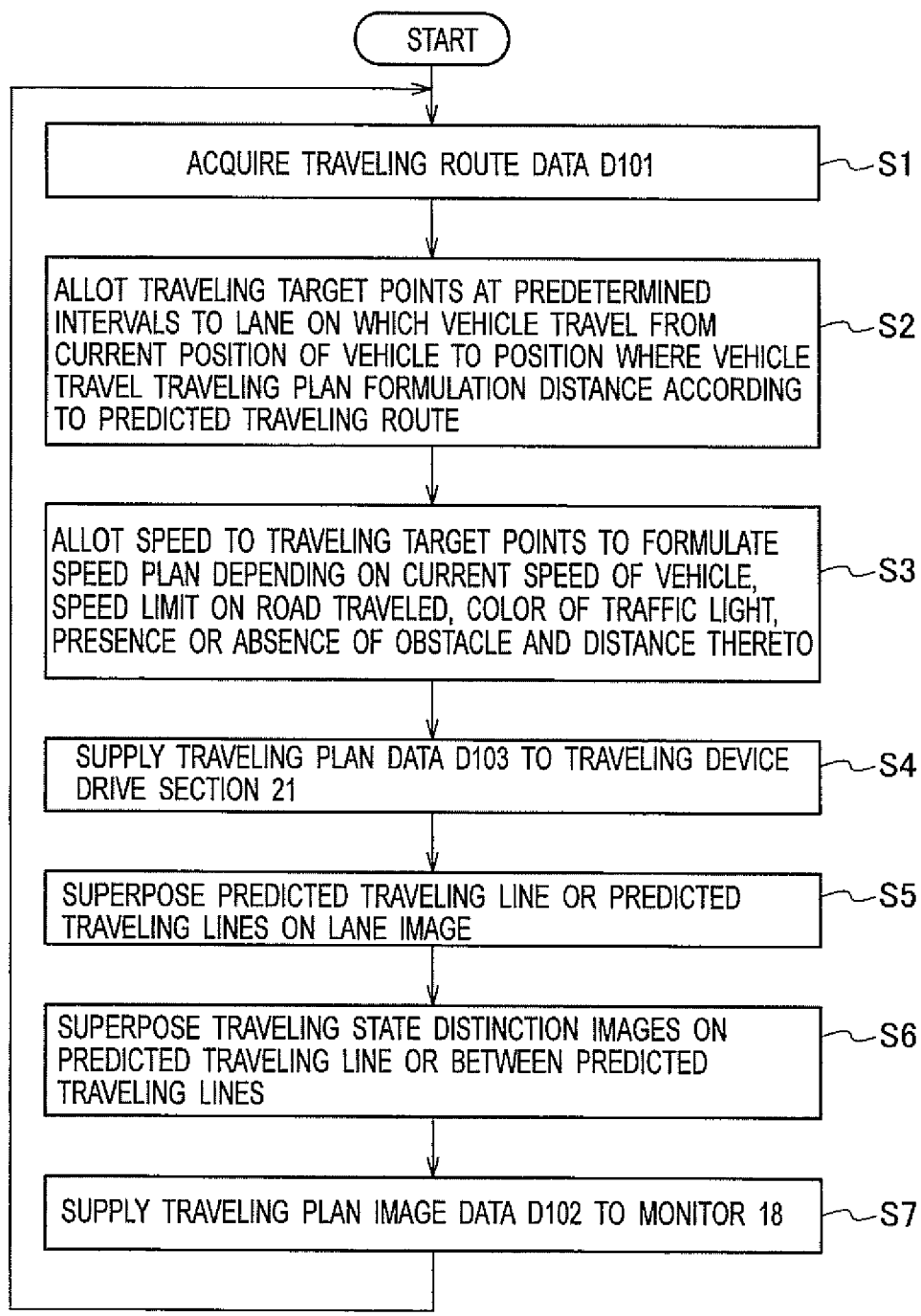
FIG. 16 a flowchart showing an operation of the vehicle driving guidance device according to the embodiment and a process of the vehicle driving guidance method according to the embodiment.

The operation of the vehicle driving assistance device according to the embodiment and the process of the vehicle driving assistance method according to the embodiment described above are explained in more detail below with reference to the flowchart shown in FIG. 16. As shown in FIG. 16, the controller 10 acquires the traveling route data D101 from the traveling route data storage section 17 in step S1.

In step S2, the controller 10 allots the traveling target points at predetermined intervals to the lane on which the host vehicle travels from the current position of the host vehicle (the vehicle 100) to the position where the host vehicle travels the traveling plan formulation distance according to the predicted traveling route indicated by the traveling route data D101. In step S3, the controller 10 allots the speed to the respective traveling target points to formulate the speed plan depending on the current speed of the host vehicle, the speed limit on the road traveled, the color of the traffic light, the presence or absence of an obstacle and the distance thereto.

Through step S2 and step S3, the traveling plan data D103 is generated indicating the predicted traveling state of either the driving state or the braking state to which the vehicle 100 is set.

In step S4, the controller 10 supplies the traveling plan data D103 to the traveling device drive section 21. In step S5, the controller 10 superposes the predicted traveling line or the predicted traveling lines on the lane image in the camera image. In step S6, the controller 10 superposes the traveling state distinction images on the predicted traveling line or between the predicted traveling lines. Through step S5 and step S6, the traveling plan image data D102 indicating the traveling plan image is generated.

In step S7, the controller 10 supplies the traveling plan image data D102 to the monitor 18. The monitor 18 thus displays the camera image on which the traveling plan image is superposed. The controller 10 returns the process to step S1 after finishing step S7 and repeats the process from step S1 to step S7.

The process above exemplifies the case where the camera 13 is used and the traveling plan image is superposed on the lane image in the camera image. A laser range finder may be used instead of the camera 13. The laser range finder radiates laser light, and the controller 10 thus detects reflected waves reflected on the road, so as to acquire the image data indicating the lane of the road.

When the laser range finder is used instead of the camera 13, the image data indicating the lane of the road output from the laser range finder is input to the traveling plan image data generation section 102, instead of the imaging data D13. The traveling plan image data generation section 102 may superpose the traveling plan image on the lane image indicated by the image data indicating the lane of the road.

Figure 17:
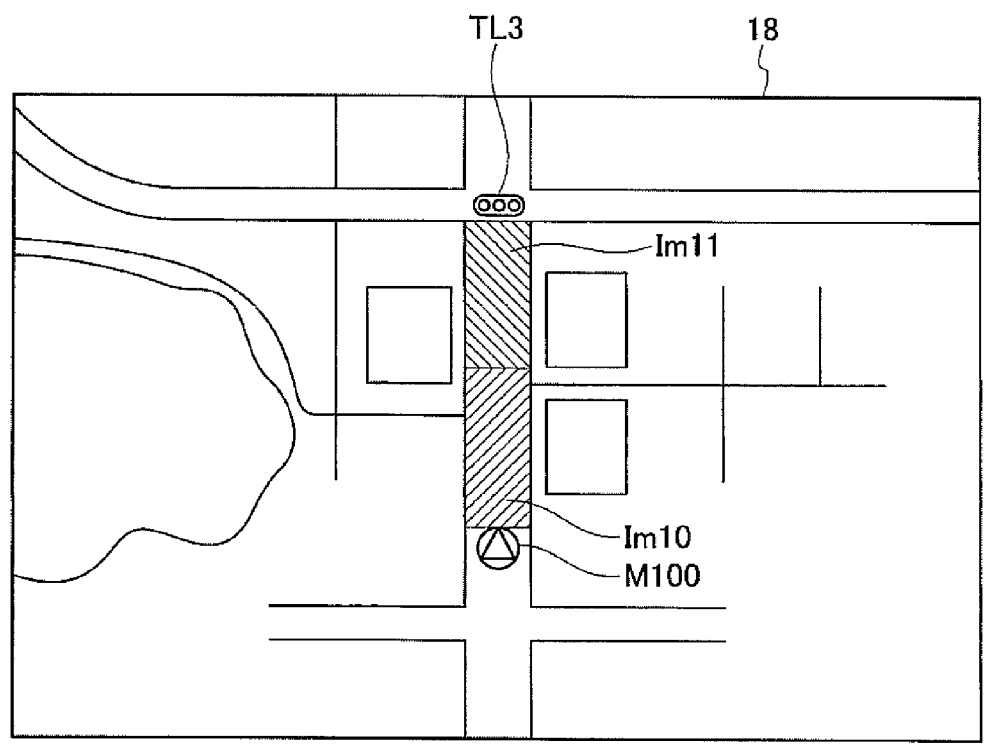
FIG. 17 is a view showing a fifth example of the traveling plan image used in the vehicle driving guidance device and method according to the embodiment.

In the case of a fifth example shown in FIG. 17, the traveling plan image is not superposed on the camera image imaging the actual road on which the vehicle 100 is traveling but may be superposed on the map image included in the map data D12. The map image indicates a route image corresponding to the predicted traveling route of the host vehicle. FIG. 17 is a view showing roads around the current position of the vehicle 100 indicated on the monitor 18 based on the map data D12. Current position mark M100 indicates the current position of the vehicle 100.

The display example shown in FIG. 17 indicates the traveling direction of the vehicle 100 upward. Here, a traffic light TL3 ahead of the vehicle 100 is assumed to be red. The traveling plan formulation section 103 formulates a traveling plan in such a manner as to gradually decelerate the vehicle 100 from a constant speed so as to stop the vehicle in front of the traffic light TL3.

As shown in FIG. 17, the traveling plan image data generation section 102 superposes, on the lane image in the map image, the traveling state distinction image Im10 indicating that the vehicle 100 is traveling at a constant speed in the driving state and the traveling state distinction image Im11 indicating that the vehicle 100 is decelerating in the braking state.

The display example shown in FIG. 17 indicates that the traveling state distinction images Im10 and Im11 are superposed on the entire lane image, while omitting the predicted traveling line R1 or predicted traveling lines R2. The display example shown in FIG. 17 can be implemented in such a manner as to omit step S5 shown in FIG. 16 and superpose the traveling state distinction images on the lane image in the map image in step S6.

The predicted traveling line R1 or predicted traveling lines R2 may be superposed on the lane image, and the traveling state distinction images Im10 and Im11 may further be superposed thereon. Although the image thus obtained indicates only the states of constant speed and deceleration, the traveling state distinction image Im12 may be superposed if indicating the state of acceleration.

As shown in FIG. 17, when the traveling state distinction images Im10, Im11 and Im12 are superposed on the map image, the traveling state distinction images Im10, Im11 and Im12 are not required to be semitransparent. Instead of the traveling state distinction images Im10, Im11 and Im12, distinction images varying in shape depending on the traveling state, such as the traveling state distinction images Im20, Im21 and Im22, may also be used.

FIG. 17 is a two-dimensional (2D) map image but may be a three-dimensional (3D) map image. The 3D map image can approximate to a camera image.

The vehicle driving guidance device according to the embodiment as illustrated above includes the traveling plan formulation section 103, the traveling plan image data generation section 102 and the monitor 18.

The traveling plan formulation section 103 sets, as a traveling plan formulation distance, a predetermined distance ahead of a current position of the vehicle 100 traveling on a road on a predicted traveling route. The traveling plan formulation section 103 formulates a traveling plan indicative of which predicted traveling state the vehicle 100 is in, a driving state or a braking state, when the vehicle 100 travels the traveling plan formulation distance.

The traveling plan image data generation section 102 generates traveling plan image data D102 in which traveling state distinction images (such as Im10, Im11 and Im12 or Im20, Im21 and Im22) visually varying depending on the driving state and the braking state indicated by the traveling plan are positioned in a lane image of the road on which the vehicle travels. The monitor 18 displays a traveling plan image indicated by the traveling plan image data D102.

The vehicle driving guidance device according to the embodiment is configured as follows. The traveling plan formulation section 103 serving as a road information detection section detects information of the road on which the host vehicle (the vehicle 100) travels on the predicted traveling route. The speed sensor 15 serving as a speed detection section detects the speed of the host vehicle.

The traveling plan formulation section 103 serving as a predicted traveling state setting section sets the host vehicle to either the driving state or the braking state when the host vehicle travels on the predicted traveling route, based on the information of the road detected by the road information detection section and the speed detected by the speed sensor 15.

The traveling plan image data generation section 102 generates image data (traveling plan image data) of an image in which the traveling state distinction images indicating the driving state and the braking state set by the predicted traveling state setting section are positioned on the road indicating the predicted traveling route. The monitor 18 serving as a display unit displays the image of the image data.

Here, the positioning of the traveling state distinction images on the road may represent, any of superposition of the traveling state distinction images on the lane image indicating the road, replacement of part of the lane image with the traveling state distinction images, and replacement of the entire lane image with the traveling state distinction images.

The vehicle drive assistance method according to the embodiment includes the following steps. A road information detection step detects information of a road on which the host vehicle travels on a predicted traveling route. A speed detection step detects the speed of the host vehicle. A setting step sets the host vehicle to either a driving state or a braking state when the host vehicle travels on the predicted traveling route based on the information of the road detected in the road information detection step and the speed detected in the speed detection step.

An image data generation step generates image data of an image in which traveling state distinction images indicating the driving state and the braking state set in the setting step are positioned on the road indicating the predicted traveling route. A display step displays the image of the image data on the display unit.

According to the configuration described above, the vehicle driving guidance device and method according to the embodiment can provide guidance to inform an occupant of which predicted traveling state the host vehicle is to be set, the driving state or the braking state.

In the vehicle driving guidance device according to the embodiment, the image data generation section visually differentiates a traveling state distinction image indicating the driving state from a traveling state distinction image indicating the braking state, so that an occupant can easily distinguish the driving state from the braking state.

In the vehicle driving guidance device according to the embodiment, the traveling plan image data generation section 102 may generate the image data as follows.

The traveling plan image data generation section 102 generates traveling plan image data of a traveling state distinction image in which a first distinction image is positioned in a region on the road in which the vehicle 100 travels at a constant speed. The traveling plan image data generation section 102 also generates traveling plan image data of traveling state distinction images in which a second distinction image is positioned in a region on the road in which the vehicle 100 is decelerating and a third distinction image is positioned in a region on the road in which the vehicle 100 is accelerating.

Accordingly, the vehicle driving guidance device can provide not only the guidance to merely inform the driving state and the braking state but also the guidance to inform the state of acceleration of the vehicle 100.

The vehicle plan formulation section 103 may include both the traveling target point setting section 1032 and the speed plan formulation section 1031. The traveling target point setting section 1032 allots a plurality of traveling target points at predetermined intervals to the road within a traveling plan formulation distance on which the vehicle 100 travels. The speed plan formulation section 1031 allots the speed of the vehicle 100 to the respective traveling target points and formulates a speed plan when driving the vehicle 100 the traveling plan formulation distance.

Accordingly, the vehicle 100 can drive autonomously.

The traveling plan image data generation section 102 may use, as the traveling state distinction images, distinction images varying in color or shape depending on the driving state and the braking state. Accordingly, an occupant can easily recognize the driving state and the braking state.

The traveling plan image data generation section 102 may use semitransparent distinction images as the traveling state distinction images. Accordingly, the lane image is prevented from being completely blocked so that traffic signs or objects on the road can be recognized.

The traveling plan image data generation section 102 may set a width of the respective traveling state distinction images in a range of a minimum width corresponding to a width of weaving of the vehicle 100 due to a control error of the steering 22s of the vehicle 100 to a maximum width obtained in such a manner as to add the width of weaving of the vehicle 100 due to the control error to a width of the vehicle 100. Accordingly, an occupant can be prevented from feeling uncomfortable when seeing the traveling state distinction images.

The traveling plan formulation section 103 may increase the traveling plan formulation distance as the speed of the vehicle 100 increases. The traveling plan image data generation section 102 may increase the scope of the respective traveling state distinction images in the traveling direction of the host vehicle as the speed of the vehicle 100 increases. Accordingly, an occupant can easily recognize the predicted traveling state of the vehicle 100 even when the speed increases.

The traveling plan image data generation section 102 may vary the traveling state distinction images depending on a gradient or curvature of the road on which the vehicle 100 travels. Accordingly, an occupant can also recognize conditions of the road.

The vehicle driving guidance device according to the embodiment may further include the obstacle detection section 104 for detecting an obstacle located ahead of the vehicle 100. The traveling plan formulation section 103 may formulate the traveling plan depending on the result of the presence or absence of the obstacle detected by the obstacle detection section 104 or a distance from the vehicle 100 to the obstacle detected so as to set the host vehicle to either the driving state or the braking state.

Since the host vehicle can be set to either the driving state or the braking state while the traveling plan is formulated in view of the presence or absence of an obstacle, the traveling state distinction images can be displayed according to the traveling plan formulated depending on actual road conditions where an obstacle can be present. Accordingly, an occupant can be provided with the accurate traveling state distinction images corresponding to the actual road conditions.

FIG. 4 shows the configuration in which the traveling route data generation section 101 generates the traveling route data D101, and the traveling route data storage section 17 stores the generated traveling route data D101. When the predicted traveling route on which the vehicle 100 travels is fixed, the traveling route data generation section 101 is not necessarily provided in the vehicle driving guidance device as long as the traveling route data storage section 17 for storing the predetermined traveling route data D101 is provided.

The traveling plan formulation section 103 formulates the speed plan of the vehicle 100 based on the speed limit information D12s included in the map data D12. The acquisition method for the speed limit information is not limited to that from the map data D12.

For example, transmitting devices may be installed adjacent to roads on which the vehicle 100 travels to transmit speed limit information of each road by radio so that a receiver mounted on the vehicle 100 can receive the speed limit information.

The vehicle 100 may be either an autonomous vehicle or a common vehicle that a driver drives.

As described above, the vehicle drive guidance device and method according to the embodiment can display the route image corresponding to the predicted traveling route of the host vehicle on the monitor 18 in the display mode corresponding to at least either the driving state (driving force) or the braking state (braking force) of the host vehicle. The vehicle drive guidance device and method according to the embodiment can display the route image corresponding to the predicted traveling route of the host vehicle on the monitor 18 in the display mode corresponding to at least either the accelerating state (acceleration) or the decelerating state (deceleration) of the host vehicle.

The vehicle drive guidance device and method according to the present invention are not limited to the vehicle drive guidance device and method according to the embodiment described above, and various modifications and improvements can be made without departing from the scope of the present invention.

The present invention can be applied to a vehicle drive guidance device for providing guidance to inform an occupant in a vehicle of which traveling state the vehicle travels in on a predicted traveling route, a traveling state of a driving state or acceleration or a traveling state of a braking state or deceleration.

The invention claimed is:

1. A vehicle driving guidance device comprising:
a predicted traveling route setting section configured to set a predicted traveling route to a host vehicle;
a predicted traveling state setting section configured to formulate a traveling plan indicative of how to drive the host vehicle along the predicted traveling route and set either a driving state or a braking state of the host vehicle traveling on the predicted traveling route to a road ahead of the host vehicle based on the traveling plan;
a traveling plan image generation section configured to generate a traveling plan image in which traveling state distinction images indicating the driving state and the braking state set by the predicted traveling state setting section are positioned in a route image corresponding to the predicted traveling route; and
a display unit configured to display the traveling plan image.

2. The vehicle driving guidance device according to claim 1, wherein the predicted traveling state setting section formulates the traveling plan based on information about a road on which the host vehicle travels including a speed limit of the road and a state of a traffic light and based on a speed of the host vehicle.

3. The vehicle driving guidance device according to claim 2, wherein the predicted traveling state setting section determines a state of the traffic light based on imaging data obtained by a camera for imaging an outside from a front of the host vehicle.

4. The vehicle driving guidance device according to claim 1, further comprising an obstacle detection section configured to detect an obstacle located in front of the host vehicle,
wherein the predicted traveling state setting section formulates the traveling plan depending on a result of a presence or absence of the obstacle detected by the obstacle detection section or a distance between the host vehicle and the obstacle.

5. The vehicle driving guidance device according to claim 4, wherein the obstacle detection section detects the obstacle based on at least imaging data obtained by a camera for imaging an outside from a front of the host vehicle and ranging data obtained by a ranging sensor for measuring a distance between the host vehicle and an object present in front of the host vehicle.

6. The vehicle driving guidance device according to claim 1, wherein the traveling plan image generation section differentiates a color of the traveling state distinction image indicating the driving state from a color of the traveling state distinction image indicating the braking state.

7. The vehicle driving guidance device according to claim 1, wherein the traveling plan image generation section sets a width of the route image in a range of a minimum width corresponding to a width of weaving of the host vehicle due to a control error of steering of the host vehicle to a maximum width corresponding to a width in which the width of the weaving of the host vehicle due to the control error of the steering of the host vehicle is added to a width of the host vehicle.

8. The vehicle driving guidance device according to claim 1, wherein the traveling plan image generation section increases a scope of the route image in a direction in which the host vehicle travels as a speed of the host vehicle increases.

9. A vehicle driving guidance device comprising:
a predicted traveling route setting section configured to set a predicted traveling route to a host vehicle; and
a predicted traveling state setting section configured to formulate a traveling plan indicative of how to drive the host vehicle along the predicted traveling route and set either an accelerating state or a decelerating state of the host vehicle traveling on the predicted traveling route to a road ahead of the host vehicle based on the traveling plan;
a traveling plan image generation section configured to generate a traveling plan image in which traveling state distinction images indicating the accelerating state and the decelerating state set by the predicted traveling state setting section are positioned in a route image corresponding to the predicted traveling route; and
a display unit configured to display the traveling plan image.

10. The vehicle driving guidance device according to claim 9, wherein:
the predicted traveling state setting section sets the host vehicle to either the accelerating state, the decelerating state or a coasting state; and
the traveling plan image generation section generates the traveling plan image in which traveling state distinction images indicating the accelerating state, the decelerating state and the coasting state set by the predicted traveling state setting section are positioned in the route image corresponding to the predicted traveling route.

11. The vehicle driving guidance device according to claim 9, wherein the traveling plan image generation section differentiates a color of the traveling state distinction image indicating the accelerating state from a color of the traveling state distinction image indicating the decelerating state.

12. A vehicle driving guidance method comprising:
a first setting step of setting a predicted traveling route to a host vehicle;
a second setting step of formulating a traveling plan indicative of how to drive the host vehicle along the predicted traveling route and setting either a driving state or a braking state of the host vehicle traveling on the predicted traveling route to a road ahead of the host vehicle based on the traveling plan;
a generation step of generating a traveling plan image in which traveling state distinction images indicating the driving state and the braking state set in the second setting step are positioned in a route image corresponding to the predicted traveling route; and
a display step of displaying the traveling plan image on a display unit.

13. A vehicle driving guidance method comprising:
a first setting step of setting a predicted traveling route to a host vehicle;
a second setting step of formulating a traveling plan indicative of how to drive the host vehicle along the predicted traveling route and setting either an accelerating state or a decelerating state of the host vehicle traveling on the predicted traveling route to a road ahead of the host vehicle based on the traveling plan;

a generation step of generating a traveling plan image in which traveling state distinction images indicating the accelerating state and the decelerating state set in the second setting step are positioned in a route image corresponding to the predicted traveling route; and a display step of displaying the traveling plan image on a display unit.

* * * * *